July 25, 1950 R. W. JENSEN 2,516,390
THERMOSTATIC TEMPERATURE AND FLOW CONTROL VALVE
Filed Aug. 27, 1945 4 Sheets-Sheet 1
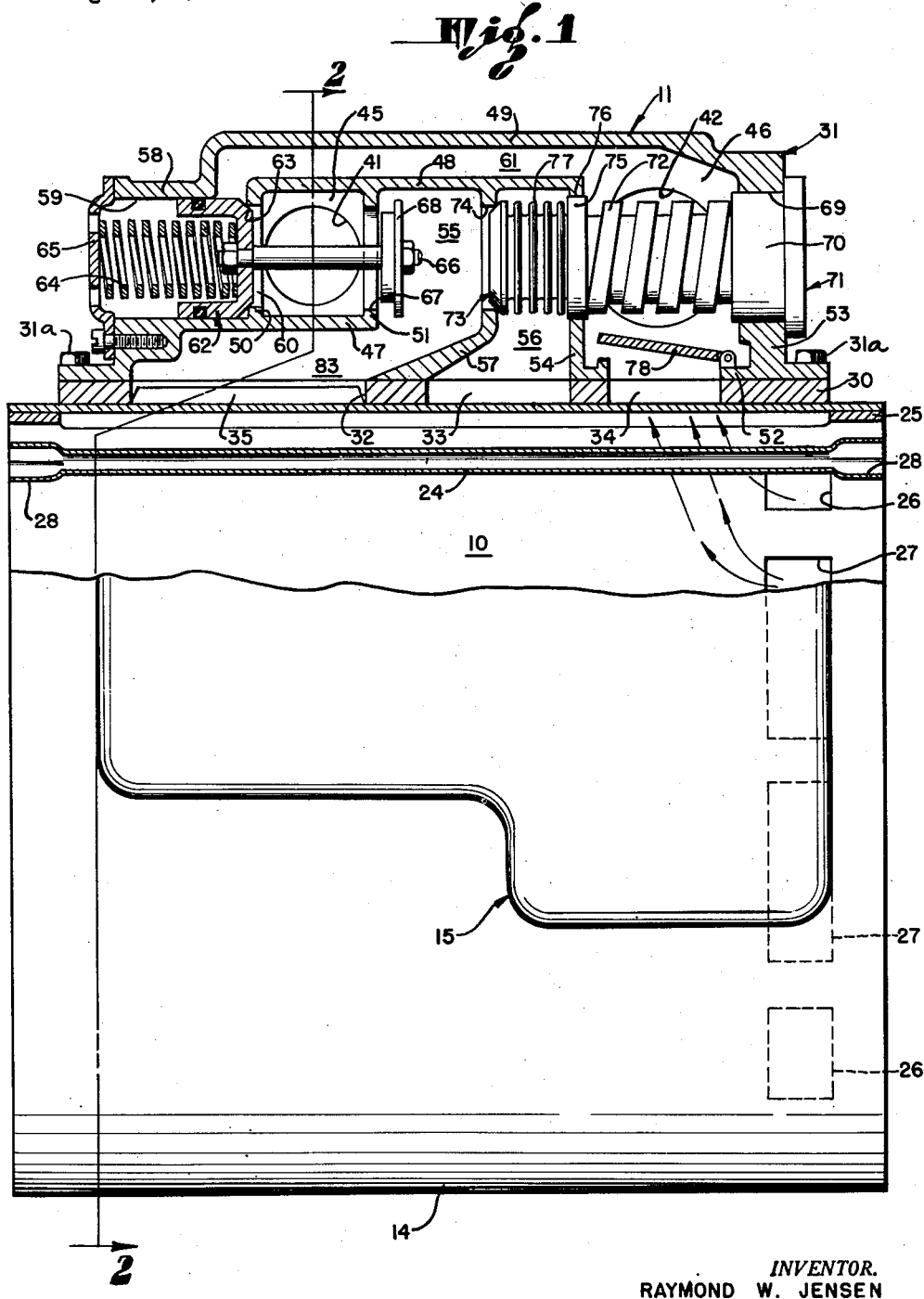
INVENTOR.
RAYMOND W. JENSEN
BY
ATTORNEY

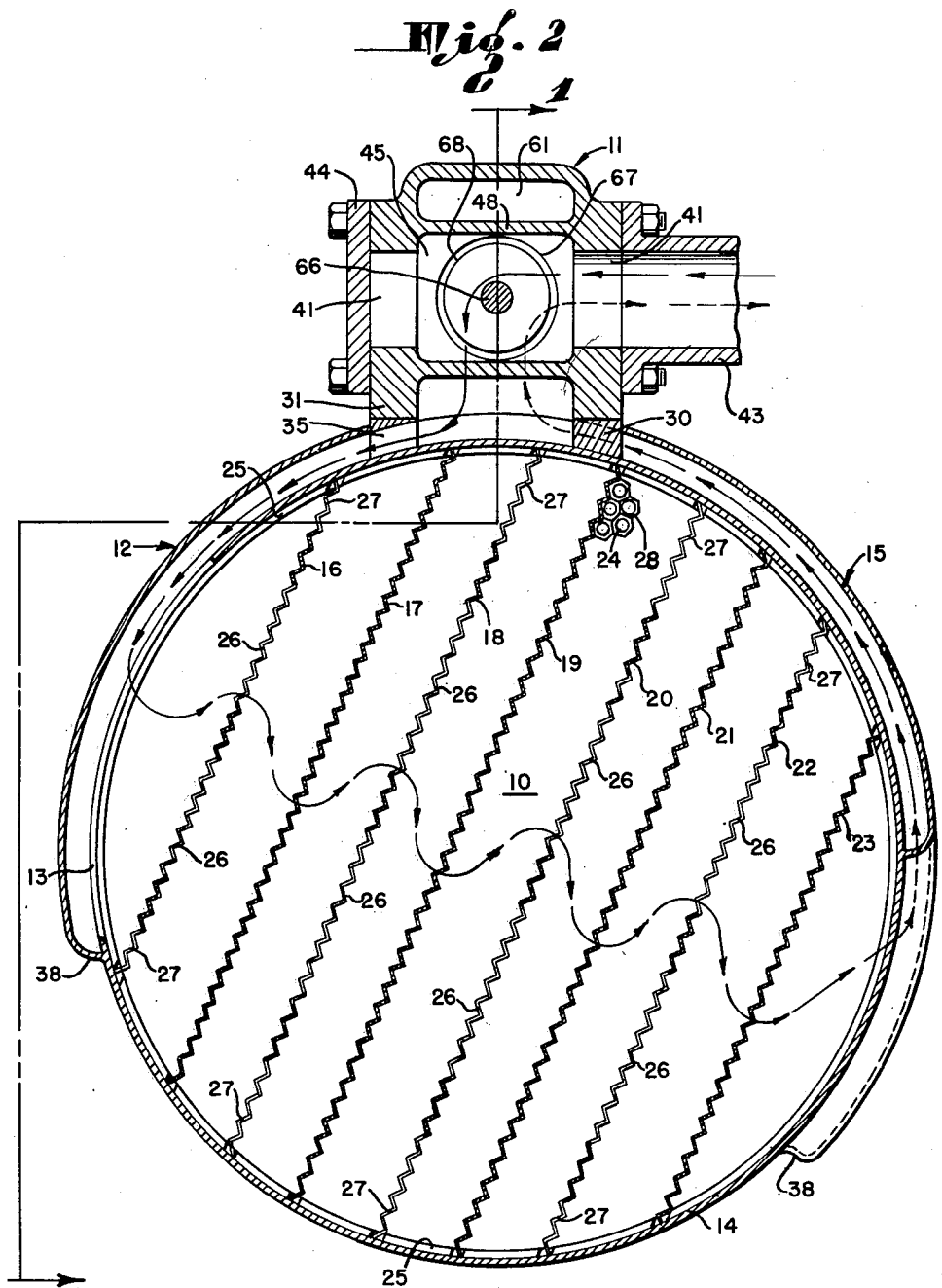

July 25, 1950 R. W. JENSEN 2,516,390
THERMOSTATIC TEMPERATURE AND FLOW CONTROL VALVE
Filed Aug. 27, 1945 4 Sheets-Sheet 3

INVENTOR.
RAYMOND W. JENSEN
BY
ATTORNEY

July 25, 1950 — R. W. JENSEN — 2,516,390
THERMOSTATIC TEMPERATURE AND FLOW CONTROL VALVE
Filed Aug. 27, 1945 — 4 Sheets-Sheet 4

INVENTOR.
RAYMOND W. JENSEN
BY
ATTORNEY

Patented July 25, 1950

2,516,390

UNITED STATES PATENT OFFICE 2,516,390

THERMOSTATIC TEMPERATURE AND FLOW CONTROL VALVE

Raymond W. Jensen, Los Angeles, Calif., assignor to The Garrett Corporation, Airesearch Manufacturing Company division, Los Angeles, Calif., a corporation of California Application August 27, 1945, Serial No. 612,947

6 Claims. (Cl. 236—34)

This invention relates to the control of a flow of liquid through a cooler having heat exchange means for cooling the liquid and having a warm up bypass for bypassing the heated liquid in such a manner as to relieve excess pressure and to warm up the heat exchange means when congealment tends to occur therein. The invention is particularly useful in the control of the flow of lubricating oil through an oil cooler employed in regulating the temperature and viscosity of lubricating oil for aircraft engines. A primary function of such a cooler is to remove excess heat from the oil as it comes from the engine in a heated condition and to return the oil to the engine in a proper condition of fluidity and viscosity. An aircraft oil cooler must be capable of faithfully carrying out this function when the temperature of the atmosphere is high (placing a high cooling load on the cooler) and when the temperature of the atmosphere is extremely low (giving rise to the problem of congealment of the oil against the walls of the heat exchange passages of the cooler). It must be capable of handling not only mild variations in temperature, but also such extremes of temperature change. In general, there have been two lines of development of apparatus for handling these problems. One method of attack is to utilize thermostatic control of the flow of a coolant (usually air) through the cooler so as to reduce the cooling effect when atmospheric temperature drops. But it is also highly desirable to utilize thermostatic control of the oil circulation through the cooler in connection with suitable means for bypassing a portion or all of the oil around the cooler core when oil viscosity becomes too great, in order to relieve the core of the excessive pressures which are developed as the result of excessive viscosity, and at the same time to reduce the cooling effect and to permit the temperature of the oil to rise.

But even further measures are usually considered highly desirable if not essential to the proper control of oil temperature under widely varying conditions. It is possible for the temperature to drop so rapidly as to reach a low stage such that the thickening of the oil is not arrested even where all of the oil is bypassed through a warm up jacket, and it may become necessary to bypass some of the oil directly from the cooler inlet to the cooler outlet or externally of the cooler so as to relieve the warm up jacket as well as the cooler core of excessive pressure. Necessity for such bypassing may also arise from sudden surges at the cooler inlet. In connection with such bypassing, it is desirable to isolate the core from the high inlet pressure. The present invention contemplates a control mechanism adapted to handle all of these problems and yet of a simple and compact construction and arrangement.

A particular object of the invention is to provide a combined temperature responsive and excess pressure responsive valve mechanism which is incorporated in an oil cooler control head of minimum height. To this end, the invention provides an arrangement wherein the thermostatic valve unit and the surge valve unit are mounted on a common axis so that the surge valve unit does not project above the general top of the control head as it does in earlier structures of this general class.

A further object of the invention is to provide an oil cooler having an oil control mechanism including a thermo-responsive control so arranged as to provide maximum accuracy of response by the thermostat to temperature conditions in the cooler. Specifically, the invention aims to avoid any independent control of the thermostat by oil passing through the warm up bypass. When the core commences to congeal, the flow through the warm up bypass is augmented and this flow is at a higher temperature than the flow through the core because of the fact that the oil is not cooled appreciably in going through the bypass. If the thermostat is permitted to respond to this relatively hot oil flowing through the bypass at a time when the oil flowing through the core is tending to congeal, the effect upon the oil flow control valve will be to tend to concentrate the flow through the core and to cut off the flow through the bypass, which is exactly the opposite to what is required for curing the congealment condition. Accordingly, it is important that any independent control of the thermostat by the bypassing oil be avoided. The invention accomplishes this result by providing an arrangement wherein the thermostat is washed by the combined streams of oil from the core and from the bypass, and in which these streams are thoroughly mixed before they reach the thermostat. In this respect the invention contemplates an arrangement wherein the division of oil flows between the core and warm up bypass is made at the inlet of the cooler but is controlled by temperature response at the outlet.

Another object of the invention is to provide an improved temperature responsive valve unit of a type employing an expansible wax or equivalent material as the thermo-responsive means.

Further objects and advantages of the invention will be brought out in the following part of the specification.

Referring to the drawings which are for illustrative purposes only:

Fig. 1 is a side elevation, partially in axial section, of an oil cooler embodying the invention, taken as indicated by the line 1—1 of Fig. 2.

Fig. 2 is a transverse sectional view of the same taken on the line 2—2 of Fig. 1.

Figure 3:
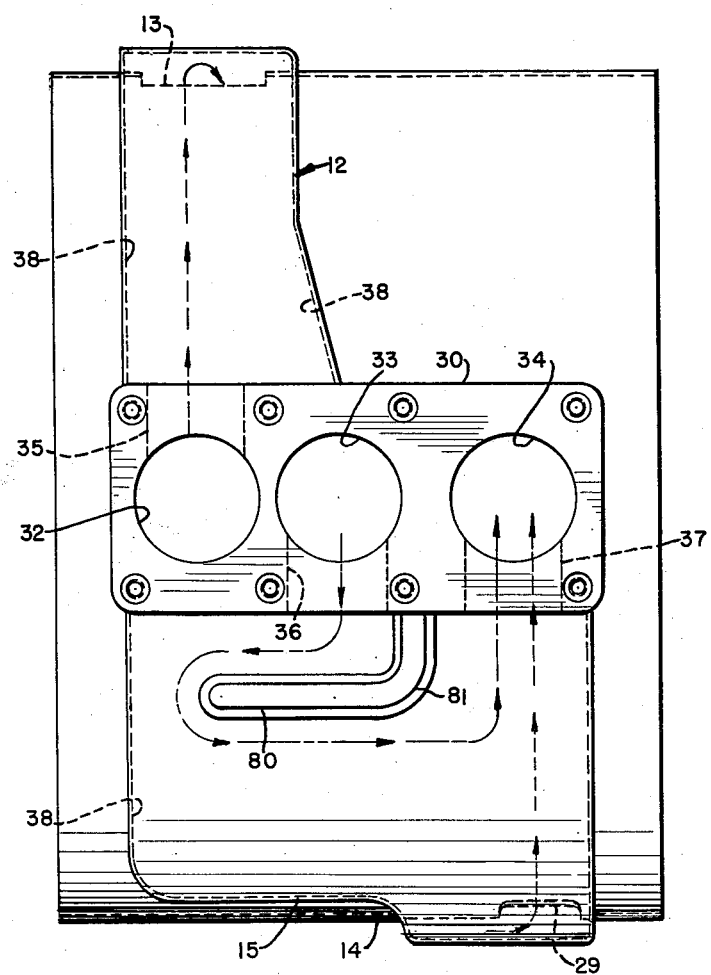
Fig. 3 is a plan view of the cooler with the control head removed.

As an example of one form in which the invention may be embodied I have shown in Figs. 1, 2, and 3 an aircraft oil cooler embodying a core 10, a control head 11, an inlet duct 12 extending from the control head 11 to an inlet port 13 in the shell 14 of the core 10, and a combined outlet duct and warm up bypass 15.

The heat exchange core 10 includes a plurality of baffles 16, 17, 18, 19, 20, 21, 22, and 23 extending from end to end of the cooler core and in planes inclined at an acute angle to the vertical axial plane of the core and head. Between the baffles 16—23 and the shell 14 is defined a plurality of rectangular compartments also extending from end to end of the cooler core and each filled with a bundle of heat exchange tubes 24. The tubes 24 and baffles 16—23 are assembled to form the core 10 with the ends of the tubes 24 confined within a spacer ring 25. The spacer ring 25 provides an enlarged annular space between the periphery of the core 10 and the inner surface of the shell 14, such annular space being broken up by the baffles 16—23 into a plurality of longitudinally extending "free flow" passages. The baffles 16—23 are provided with ports 26 and 27 at their respective ends, the ports in the baffles 16, 18, 20, and 22 being disposed at one end of the core and the ports in the baffles 17, 19, 21, and 23 being disposed at the other end of the core, whereby the compartments between the baffles are joined to form a tortuous passage for the flow of oil through the cooler. The ports 27 are each bounded on one side by the shell 14, whereby the "free flow" spaces between the periphery of the core and the inner surface of the shell are joined together to form a continuous "free flow" passage from the inlet ports to the outlet port.

The tubes 24 are provided with expanded hexagonal ends 28 which are joined together and to the ring 25, as by brazing, to form ends in the core. A coolant, such as air, is adapted to pass through the tubes 24, and the fluid to be cooled, such as lubricating oil, is adapted to flow in the spaces between the tubes 24, through the tortuous flow passage previously described. The oil enters the core at the core inlet 13 and is discharged into the outlet side of the warm up jacket 15.

Secured to the top of the shell 14 is a flange or collar 30 having a flat finished upper surface, against which the control head casing 31 is fitted and secured, as by means of cap screws 31a. The flange 30 (Fig. 3) is provided with a core inlet opening 32, a warm up jacket inlet opening 33, and a common outlet opening 34 extending vertically therethrough, and with a port 35 extending through one side, from the opening 32 to the inlet duct 12 (Figs. 2 and 3), and ports 36 and 37 extending through its other side from the openings 33 and 34 to the respective sides of the warm up jacket 15. The inlet duct 12 and warm up jacket 15 are each of inverted channel construction, having a marginal flange 38 which is joined to the outer surface of the shell 14 as by brazing and having end edges joined in a similar manner to the side faces of the collar 30. The control head casing 31 has a pair of inlet openings 41 in its respective side walls near one end thereof and a pair of outlet openings 42 in its respective side walls near the other end thereof. One set of openings 41 and 42 are connected to inlet and outlet couplings 43, while the other set of openings 41 and 42 are closed by caps 44. By providing duplicate sets of inlet and outlet openings, it becomes possible to attach the cooler to a fluid system with the fluid lines coming into whichever side of the cooler is most desirable for the particular installation. The openings 41 are axially aligned and the same is true of the openings 42. The openings 41 communicate with an inlet chamber 45 and the openings 42 communicate with an outlet chamber 46, in the control head housing 31. The inlet chamber 45 is defined between the side walls of the casing 31, a pair of intermediate horizontal walls 47 and 48 generally parallel to the top wall 49, and a pair of transverse partition walls 50 and 51 joining the side walls and the walls 47 and 48. The outlet chamber 46 is defined between the top wall 49, the side walls, the bottom wall 52, an end wall 53 and a transverse partition wall 54 which joins the side walls, the bottom wall 52, and the intermediate horizontal wall 48.

Between the inlet chamber 45 and the outlet chamber 46, arranged in the order named, are a pair of valve chambers 55 and 56. These chambers are separated by a partition wall 57 joining the side walls and intermediate wall 48 of the casing 31, and are defined between the side walls and the walls 48, 51, 54, and 57.

The walls 47 and 48 are joined to the end wall 58 of the casing 31, in which there is provided a cylindrical bore 59. The bore 59 communicates through the inlet chamber 45 with a port 60 in the wall 50. A direct bypass passage 61 extends from the bore 59 to the outlet chamber 46, being defined between the walls 48, 49, 51, and 58, and the side walls of the casing 31. Slidably mounted in the bore 59 and normally closing off the end of the passage 61 adjacent the bore 59 is a pressure relief valve 62. The valve 62 has a frusto-conical valve face 63 which is normally urged into seating engagement with a valve seat defined at the perimeter of the port 60 in the wall 50, yielding pressure being supplied by a spring 64 engaged between the valve 62 and a cage 65 secured to the end wall 58 of the casing 31.

The valve 62 carries a stem 66 which extends through the chamber 45 and a port 67 in the wall 51. Mounted on the stem 66 and cooperating with the port 67 is a core protection valve 68.

Mounted in an opening 69 in the end wall 53 is the base portion 70 of a thermo-responsive valve unit 71 which includes a bi-metallic coil 72 controlling the movement of a valve head 73 which cooperates with a port 74 within the wall 57. The valve unit 71 includes a flange 75 which closes an opening 76 in the wall 54 through which the valve unit projects. The head 73 is connected to the body of the valve unit by a bellows 77. The valve unit 71 is constructed in accordance with the disclosure contained in my application, Serial No.

605,490, filed July 17, 1945, now Patent No. 2,512,800, dated June 27, 1950.

The chamber 55 is connected to the core inlet opening 32. It is adapted to be connected to the chamber 56 by yielding or opening movement of the valve 73, the chamber 56 being connected to the bypass inlet opening 33. The outlet chamber 46 is connected to the common outlet 34 when an outlet check valve 78 is opened. It is also connected to the outlet port 42. The chamber 45 is connected to the inlet port 41.

In the operation of the device oil flowing into the control head inlet chamber 45 from the inlet 41 will normally flow past the open valve 68 into the chamber 55 which forms a junction between the chambers 45 and 56. When the temperature of the oil is at a normal level the thermo-responsive valve head 73 will be closed against the port 74 and the oil will be routed from the chamber 55 through the inlet ports 32 and 35 and then through the inlet duct 12 into the core. It will then pursue a tortuous path through the core 10, leaving the same by way of the outlet 29 and the outlet portion of the warm up jacket 15. From the packet 15, the oil will pass through the outlet ports 37 and 34, past the outlet check valve 78 and into the outlet chamber 46, where it will wash the thermo-responsive coil 72 to determine the position of the valve 73.

In the event the temperature of the outflowing oil drops below a predetermined level, the valve head 73 will respond with opening movement, permitting a portion of the oil to be bypassed through the port 74, chamber 56, ports 33 and 36, into the bypass jacket 15. The jacket 15 has an intermediate region indented and attached to the wall of the shell 14, the indented portion having an axially extending arm 80 and a circumferentially extending arm 81 joining the arm 80 to the collar member 30. The bottom of the indented portion is jointed to the outer surface of the shell 14. This indented portion of the jacket forms a baffle around which the oil is forced to take a path carrying it across substantially the full length of the cooler shell before it reaches the outlet 37.

It may be noted at this point that the warm up jacket 15 covers one side of each of the compartments defined between the baffles 16—20 and that the remainder of these compartments, defined between the baffles 20—23 are covered by the control head. Thus the entire area of one side of each compartment is in heat relation to the path of flow of warm up oil in the warm up jacket 15. This stimulates the thawing of a congealed cooler by liquefying the oil in the "free flow" spaces on the sides of the core compartments, and initiating a flow in the tortuous free flow passage formed collectively by these free flow spaces.

The amount of bypassing through the warm up jacket 15 will depend upon the extent of opening of the valve head 73. In the event of congealment, the pressure in the inlet chamber 45 may rise to a point where the valve 63 is forced to a position establishing communication between the chamber 45 and the direct bypass 61, at the same time closing the valve 68. Thus the incoming oil is bypassed directly to the discharge chamber 46 and flow to the inlets of the cooler and warm up jacket is cut off by the check valve 68. The same results may occur in the event of a sudden surge of pressure at the inlet. Excessive pressure in the chamber 55, inadequate to cause the surge valve to operate but sufficient to cause the valve head 73 to yield, may be relieved through the bypass jacket 15, even though the thermostat is calling for the closed position of the valve head 73.

The invention has the advantage of reducing the height of the control head 31 by mounting the valves 71 and 62 and 63 on a common horizontal axis in contrast to previous arrangements, wherein the surge valve has been disposed on a vertical axis and the thermo-responsive valve on an inclined axis. Communication between the chamber 55 and the port 32 is provided for by a space 83 below the partition wall 47 and above the bottom plane of the control head. The wall 57 is inclined downwardly and to the left as viewed in Fig. 1 to meet the area of the collar 30 lying between the ports 32 and 33.

Figure 4:
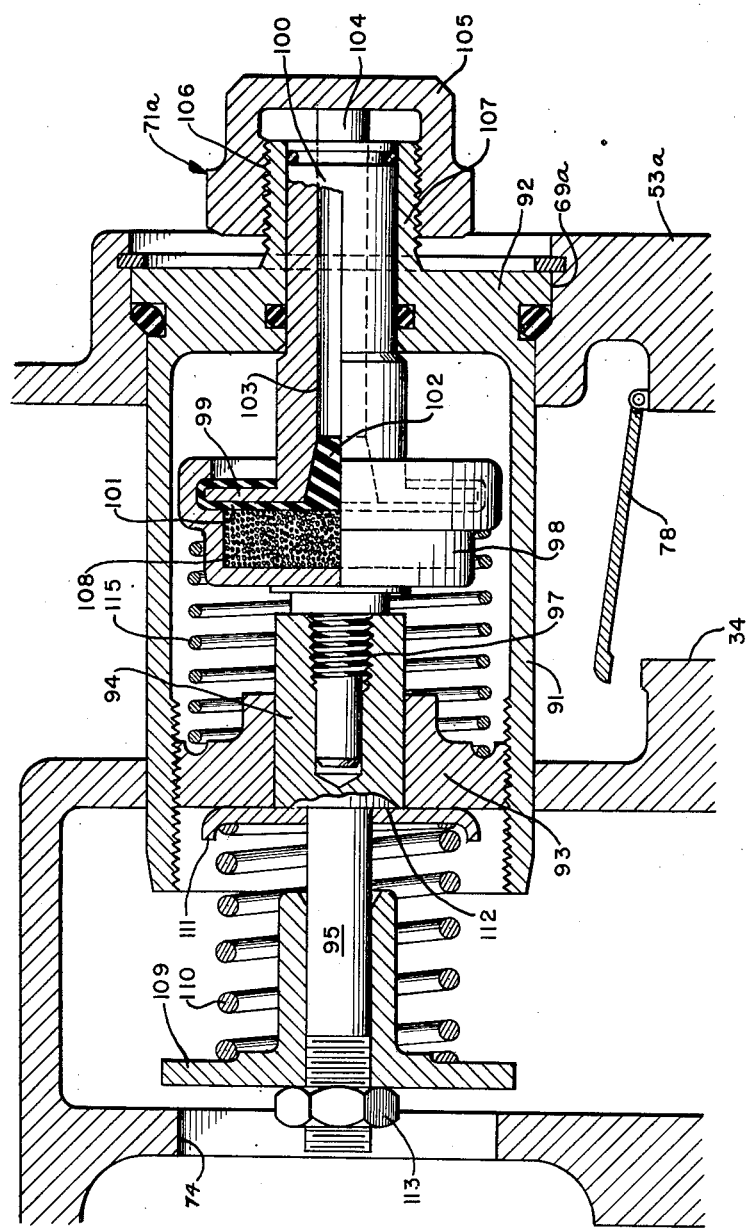
Fig. 4 is an axial sectional view through a control head embodying my improved Vernet type thermo-responsive valve unit.

In the form of the invention shown in Fig. 4, the thermo-responsive valve unit 71a includes a tubular shell 91 having an end portion 92 mounted in an opening 69a in the end wall 53a. Fitted into the shell 91 is a bushing 93 in which is slidably mounted the head 94 of a valve rod 95. Secured by means of a threaded stud 97 to the head 94 is a casing 98 in which is secured a flanged head 99 of a sleeve 100. Bonded to the inner face of the head 99 is a diaphragm 101 of rubber or the like (e. g., neoprene) which is formed integrally with the rubber plug 102 extending into the bore 103 of the sleeve 100. Also, mounted in the bore 103 for axial sliding movement relative to the sleeve 100, is a piston pin 104. The inner end of the pin 104 abuts the plug 102 and the outer end of the pin 104 abuts a cap 105 which is threaded at 106 onto a nipple 107 formed on the end member 92 of the shell 91.

Confined between the diaphragm or gasket 101 and the end wall of the cup 98 is a thermo-responsive body of material such as expansible wax or other thermo-responsive material, indicated at 108.

On the stem 95 is mounted a valve head 109 which cooperates with the port 74. A spring 110 is engaged between the valve head 109 and the washer 111, the latter being normally seated against a shoulder 112 defined between the head 94 and the stem 95. Threaded onto the outer end of the stem 95 is a stop nut 113 against which the valve head 109 normally rests.

In the operation of the valve unit shown in Fig. 4, a rise in temperature will cause the thermo-responsive material 108 to expand, pushing the plug 102 outwardly in the bore 103 and projecting the pin 104. Since the pin 104 is abutted against the cap 105, the expansive force will be manifested in the reactive movement of the sleeve 100 and cup 98 toward the left as viewed in Fig. 4. This will cause the stem 95 and valve head 109 to be projected toward closed relation to the port 74.

With the valve head 109 closed against the port 74, excess pressure may be relieved by yielding of the spring 110 enough to permit the valve head 109 to open. The position of the thermo-responsive part in this action will remain unchanged.

A reduction in temperature will result in contraction of the thermo-responsive material 108, permitting a spring 115 to move the cup 98 and sleeve 100 toward the right as viewed in Fig. 4.

I claim as my invention:

1. A thermo-responsive valve unit, including: a casing member; a bearing bushing threaded into one end of said casing, the other end of said casing having a bearing aligned with said bearing bushing; a valve stem slidably mounted in said bushing; a valve head slidably mounted on said valve stem; spring means having effective reaction with said valve head, and at least under some operating conditions with said bearing bushing, to permit said head to yield to excess pressure; a thermo-responsive element including a chambered head portion and a hollow sleeve portion slidably mounted in said bearing, said head portion being associated with said valve stem to transmit valve opening movement thereto; a piston pin slidably mounted in said sleeve, and adapted to receive movement from the expansion of an expansible medium within said chambered head; and abutment means against which the opposite ends of said piston engages so that said expansion movement will cause the thermo-responsive element to move bodily against said valve stem.

2. A thermo-responsive valve unit, comprising: a casing member; a bearing bushing threaded into one end of said casing, the other end of said casing having a bearing aligned with said bearing bushing; a valve stem slidably mounted in said bushing; a valve head slidably mounted on said stem; stop means on said stem limiting outward movement of said head; a thermo-responsive element including a chambered head portion and a hollow sleeve portion slidably mounted in said bearing, said head portion being associated with said valve stem to transmit movement thereto; a pin slidably mounted in said sleeve and adapted to receive movement from the expansion of an expansible medium within said chambered head; abutment means against which the opposite end of said pin engages so that said expansion movement will cause the thermo-responsive element to move bodily away from said pin; and yieldable means between said valve head and said bearing bushing yieldably urging said valve head towards the stop means on said stem.

3. In a thermo-responsive valve unit: a cylindrical casing internally threaded adjacent one end; an externally threaded bearing bushing threadably received in the threaded portion of the casing; a valve rod having an enlarged head portion slidable in the bearing bushing and adapted to move axially therein; a valve head slidable on the valve rod; stop means limiting outward movement of said head; a spring retainer on the valve rod adjacent the head thereof; spring means reacting between said spring retainer and valve head; and thermo-responsive means within the casing for actuating the valve rod.

4. In a thermo-responsive valve unit: a casing having a threaded portion; a bearing bushing threadably connected with the threaded portion of the casing; a valve rod having an enlarged head portion slidable in said bearing bushing; a valve head slidable on the valve rod; stop means limiting outward movement of said head on the valve rod; a spring retainer on the valve rod adjacent the head thereof; spring means reacting between said spring retainer and valve head; and thermo-responsive means in said casing for actuating the valve rod.

5. In a thermo-responsive valve unit: a casing; valve means, including a valve head; thermo-responsive means within said casing having an operable connection with said valve means for actuating same; a spring means for urging the valve means in one direction; spring means for urging the thermo-responsive means in a direction opposite the direction the valve means is urged by the first mentioned spring, said springs being in substantially axial alignment; and a bushing adjustable with respect to said casing, said bushing being disposed between said spring means for varying their effective force respectively on the valve means and the thermo-responsive means.

6. In a thermo-responsive valve unit: a casing having a threaded portion; a bearing bushing threadably connected with the threaded portion of the casing; a valve rod having an enlarged head portion slidable in said bearing bushing; a valve head slidable on the valve rod; adjustable stop means limiting outward movement of said head on the valve rod; a spring retainer on the valve rod adjacent the head thereof; spring means reacting between said spring retainer and valve head; and thermo-responsive means in said casing for actuating the valve rod.

RAYMOND W. JENSEN.

REFERENCES CITED

The following references are of record in the file of this patent:

UNITED STATES PATENTS

| Number | Name | Date |
|---|---|---|
| 1,644,786 | Mallory | Oct. 11, 1927 |
| 1,992,796 | Young | Feb. 26, 1935 |
| 2,353,577 | Magrum | July 11, 1944 |
| 2,359,448 | Shaw | Oct. 3, 1944 |
| 2,368,181 | Vernet | Jan. 30, 1945 |
| 2,379,109 | Shaw | June 26, 1945 |
| 2,400,615 | Warrick | May 21, 1946 |
| 2,419,630 | Cruzan | Apr. 29, 1947 |

FOREIGN PATENTS

| Number | Country | Date |
|---|---|---|
| 27,818 | Great Britain | 1911 |